UNITED STATES PATENT OFFICE.

THERON C. CRAWFORD, OF NEW BRIGHTON, AND LUDWIG K. BÖHM, OF NEW YORK, N. Y., ASSIGNORS TO THE STERLING LIGHT COMPANY, OF TRENTON, NEW JERSEY, AND NEW YORK, N. Y.

COMPOSITION FOR INCANDESCENT ELEMENTS.

SPECIFICATION forming part of Letters Patent No. 516,080, dated March 6, 1894.

Application filed January 23, 1893. Serial No. 459,426. (No specimens.)

*To all whom it may concern:*

Be it known that we, THERON C. CRAWFORD, a citizen of the United States, residing at New Brighton, in the county of Richmond, and LUDWIG K. BÖHM, a subject of the Emperor of Germany, residing at New York, in the county of New York, State of New York, have invented a certain new and useful Composition of Matter for Making Incandescent Elements or Mantles for Incandescent Burners, of which the following is a specification.

Our invention relates to mantles, hoods, or like incandescent devices, which are intended for use in connection with gas, and are made incandescent by the combustion of the latter, an increased illuminating effect being produced by this incandescence. Such incandescent devices, to be commercially successful, must be light, and at the same time durable, and of sufficient substance and cohesion to stand transportation and ordinary handling.

Our invention relates particularly to a composition of matter, which, used in the manufacture of such incandescent devices, produces an article having the qualities above indicated. In this composition we employ magnesium as the so called incandescent material or base. It is the material which, when heated emits the light. But it lacks cohesion and with it there must be combined another substance or substances for the purpose of making the hoods, mantles, or other articles durable in use and reasonably strong for the necessary handling incident to transportation and use. This substance or these substances are designed to form a supporting skeleton of non-incandescent material; and obviously in order not to impair materially the incandescence, should constitute as small a percentage of the mass as possible, and at the same time, secure reasonable strength and durability.

It is the object of our present improvement to reduce the non-incandescent material in the mantles to a minimum, and at the same time, secure sufficient strength in the burners to make them suitable for transportation and use. This we accomplish by the use of a composition, which we will now describe.

The new composition material consists of magnesium oxide, silicic acid, and preferably an alkali. In forming the composition, we use of the first ingredient about ninety per cent., of the second, about ten per cent., and of the third from one to two per cent.; but we do not limit ourselves to these exact proportions. For the third ingredient—alkali, we prefer potassium either hydrate or corbonate. The silicic acid may be replaced partly by phosphate of lime or magnesia, which would result in a mass containing magnesium oxide, silicic acid, alkali and phosphate of lime, or magnesium. The phosphate of lime or magnesium, adds to the strength of the burners made from this composition. These substances help to build up the supporting skeleton in the mantle and thereby strengthen the same; in this result their action is similar to that of borax, but they are preferable to the latter because they make a mixture not so easily fusible by heat as the borax. The material obtained by the described composition, is mixed with a suitable organic glutinous substance in order to obtain a plastic mass, and the mantles, hoods or the other articles are then shaped or molded from this mass and baked in suitable ovens.

The alkali may be added in solution to the glutinous substance, and the latter may be molasses, or any like material. This modification in the manipulation, of course, contemplates no alkali in the first composition, and is especially suitable in case potassium hydrate is employed. When carbonate of potassium is used, it may be preferable to add it in the form of dry powder, to the magnesium oxide. The carbonate will then be reduced to potassium oxide during the process of baking, and as such, it will combine with the silicic acid and magnesium oxide to form a supporting skeleton for the greater mass of the magnesium oxide, which is left uncombined and which is the incandescent material emitting light. The composition of silicic acid and potassium is silicate of potassium, but as such it is not found in the finished article. Silicic acid forms with magnesium oxide, silicate of magnesium, and, when some potash is present, a more complicated silicate or compound silicate is formed. This compound of silicate constitutes the supporting skeleton for the greater portion of the magnesium oxide, which is the incandescent material. To form this composition, which makes the supporting skeleton, only a small percentage of the entire quantity of magnesium oxide is utilized, only such a small quantity of alkali being used as is necessary to combine with this small percentage of the said oxide. By far the greater portion of the magnesium oxide is left free, and is the material which becomes incandescent in the practical use of the burner. It will be understood, of course, that the proportion of silicic acid alkali used is sufficient to unite with only a comparatively small proportion of the magnesium oxide, thus leaving a large percentage of the latter uncombined, as already stated. Clays have been used for similar purposes. They contain silicic acid, in combination with aluminium oxide, and in a free condition as a mechanical mixture. Uncombined silicic acid is found in clays in various quantities, and, as silicic acid is the principal substance which forms the supporting glazy skeleton in the mantles, or incandescent articles, these various quantities of said acid in the clays give burners of various strength. For this reason pure silicic acid is more desirable as a mineral binder for this structure. It forms, when precipitated by well known methods and after complete drying, a dust-like powder, and can in this condition be easily mixed with magnesium oxide, and the proportionate quantities thereof can always be determined with accuracy. In our composition we are also relieved from the presence of silicate of aluminium and other undesirable substances, contained in the clays. Furthermore, the presence of a small percentage of alkali, serves to strengthen the mantles. It helps to build up a harder skeleton. This results from the complicated or compound silicate mentioned above, which is formed by the use of alkali and which has great power in resisting the destructive effect of a high degree of heat.

We find that on using this composition for the manufacture of incandescent burners, or mantles, we obtain an article having a strong, durable skeleton composed of a simple or compound silicate of the magnesium, which holds and supports a comparatively large mass of magnesium oxide. We therefore obtain a burner sufficiently strong for practical purposes in transportation and use, of great durability in use as a burner, and of great illuminating power, owing to the presence of so large a quantity of magnesium oxide. This large quantity of free magnesium oxide results from the manipulation above described. As explained, silicic acid forms, with magnesium oxide, silicate, of magnesium, but if there is only a small quantity of silicic acid and a large excess of magnesium oxide, as herein specified, the silicic acid can form a combination with only a small quantity of magnesium oxide, while the remainder of the latter substance remains free or uncombined. Of course, the whole quantity of magnesium oxide can be combined with silicic acid if a sufficient quantity of the latter is employed; but, as distinctly set forth above, this is not done, only so much of the acid being used as will combine with a small percentage of the magnesium oxide. For this reason a large quantity of magnesium oxide is present in the finished article as such, free and uncombined; only enough of other substances, such as named, is added as is necessary to form the chemical combination which provides a desirable material for a supporting skeleton.

Having thus described our invention, what we claim as new, and desire to secure by Letters Patent, is—

1. A composition of matter for incandescent burners, consisting of magnesium oxide, silicic acid, and an alkali, substantially as described.

2. A composition of matter for incandescent burners consisting of magnesium oxide, silicic acid, alkali, and phosphate of lime or magnesium, substantially as described.

THERON C. CRAWFORD.
LUDWIG K. BÖHM.

Witnesses:
WM. MAYER,
A. KRASSON.